(12) United States Patent  (10) Patent No.: US 6,305,729 B1
Mukasa  (45) Date of Patent: Oct. 23, 2001

(54) APPARATUS FOR TRANSFERRING PIECES OF OPTICAL GLASS MATERIAL

(75) Inventor: Katsunori Mukasa, Omiya (JP)

(73) Assignee: Fuji Photo Optical Co., Ltd., Omiya (JP)

(*) Notice: Subject to any disclaimer, the term of this patent is extended or adjusted under 35 U.S.C. 154(b) by 0 days.

(21) Appl. No.: 09/354,971

(22) Filed: Jul. 22, 1999

(30) Foreign Application Priority Data

Jul. 27, 1998 (JP) .................................................. 10-211213

(51) Int. Cl.⁷ ....................................................... B25J 15/06
(52) U.S. Cl. ......................... 294/64.1; 414/752.1; 901/40
(58) Field of Search ................... 414/749.1, 752.1, 414/737, 222.04, 222.09, 225.01, 226.01, 226.05; 901/40; 294/64.1

(56) References Cited

U.S. PATENT DOCUMENTS 4,950,011 * 8/1990 Borcea et al. .................. 294/64.1 X
5,572,785 * 11/1996 Tveit ................................ 294/64.1 X

* cited by examiner

*Primary Examiner*—Donald W. Underwood
(74) *Attorney, Agent, or Firm*—Oblon, Spivak, McClelland, Maier & Neustadt, P.C.

(57) ABSTRACT

A transfer mechanism for transferring optical glass material to be molded into optical glass elements such as lenses or the like, one after another from a container holding a large number of work pieces of the optical glass material onto a molding surface of a lower mold member of a mold assembly unit located at a work loading/unloading station of a glass molding line. The transfer mechanism employs a tubular positioning member which is located in such a way as to circumvent a suction nozzle and adapted to hold the outer periphery of optical glass material for accurate positioning. The positioning member is supported on a lift means together with the suction nozzle, but independently movable vertically over a predetermined stroke length relative to the lift member to assume a work loading position and a work unloading position, uncovering a suction pad at the lower end of the suction nozzle into an exposed state and permitting same to pick up a molded optical element which is increased in diameter as compared with the size of a work piece before press-molding.

8 Claims, 14 Drawing Sheets

APPARATUS FOR TRANSFERRING PIECES OF OPTICAL GLASS MATERIAL

BACKGROUND OF THE INVENTION

1. Field of the Art

This invention relates generally to fabrication by press-molding of precision optical glass elements such as optical glass lenses or the like, and more particularly to a transfer mechanism for transferring work pieces of optical glass material each having curved surfaces on the opposite sides, accurately from a work container like a pallet to a predetermined position on a mold assembly unit to be used in press-molding.

2. Prior Art

For fabrication of precision optical glass elements like lenses, for example, press-molding processes are increasingly resorted to more than ever. Generally, an optical glass press-molding apparatus has a construction as shown in FIG. 12. In that figure, indicated at 1 is a mold assembly unit, at 2a is an upper pressing member, and at 2b a lower pressing member. In this case, upper and lower pressing members 2a and 2b constitute a press means. The mold assembly unit 1 is largely composed of an upper mold member 3, a lower mold member 4 and a girdler shell 5. Normally, the lower mold member 4 is fixedly assembled into the girdler shell 5, while the upper mold member 3 is movable toward and away from the lower mold member 4 under the guidance of the girdler shell 5.

In a preparatory stage prior to press-molding, the upper mold member is 3 is once separated from the lower mold member 4, and, after setting optical glass material 6 on a glass shaping surface 4a of the lower mold 4, the upper mold member 3 is closed again on the lower mold 4. Nextly, the mold assembly 1 as a whole is heated by the use of heating means 7 to soften the glass material 6, and at the same time the upper and lower molds 3 and 4 are pressed toward each other by the upper and lower pressing members 2a and 2b. As a consequence, the optical glass material 6 in the mold 1 is pressed to shape to produce an optical glass element 6 which have predetermined surface characteristics copied from glass molding surfaces 3a and 4a of the upper and lower mold members 3 and 4.

In order to carry out the lens molding operation automatically, for instance, a lens molding apparatus basically of the above-described construction can be incorporated into an automatic lens molding line in the manner as shown schematically in FIG. 13. In that figure, indicated at 10 is a molding chamber which is equipped with a heating system 7 along with upper and lower pressing members 2a and 2b. Indicated at 11 is an entrance/exit way or station through which a mold assembly unit 1 with optical glass material 6 is loaded into the molding chamber 10 or to which a mold assembly unit 1 with a molded glass product is delivered from the molding chamber 10 after press-molding therein. Indicated at 12 is an upper mold assembling/dissembling station, at 13 a work loading/unloading station. At the work loading/unloading station, optical glass material 6 is placed on a lower mold member 4, or an optical lens element which has been fabricated by press-molding is ejected from a lower mold. Accordingly, at the upper mold assembling/dissembling station 12, an upper mold member 3 is removed from a mold assembly unit 1 on the way to the loading/unloading station 13. Conversely, an upper mold member is set on a mold assembly unit 1 which arrives from the loading/unloading station 13. The mold assembly unit 1 is supported on a suitable transfer jig and thereby transferred horizontally to and from the above-mentioned stations.

First of all, a work loading pallet in the form of a container which is arranged to hold a large number of pieces of the optical glass material 6 is located at the loading/unloading station 13 along with a work unloading pallet or a jig which is arranged to hold pieces of molded lens product thereon. Besides, for automatic loading and unloading operations, a robot with a suction arm is provided at the work loading/unloading station to transfer pieces of optical glass material 6 onto the loading pallet and to pick up a molded lens product 8 from a mold assembly unit 1. This is the main reason why an upper mold member is put on or off at the upper mold assembling/dissembling station. An upper mold member 3 is picked up and retained on a holder member at the upper mold assembling/dissembling station 12, and a lower mold assembly consisting of a lower mold member 4 and a girdler shell 5 is sent to the loading/unloading station 13 with a molding surface 4a faced upward in an open state. As soon as optical glass material 6 is placed in the lower mold 4, the lower mold assembly is transferred to the upper mold assembling/dissembling station to receive an upper mold member 3 into the girdler shell 5. Then, the mold assembly unit 1 is sent into the molding chamber 10 through the entrance/exit way 11, and, while being softened under heating by the heating mechanism 7, the optical glass material 6 is pressed to shape by the press means.

Upon finishing the press-molding of a lens element within the molding chamber 10, the mold assembly unit 1 is transferred to the entrance/exit way 11 and then to the upper mold assembling/dissembling station 12 to remove the upper mold member 3 off the lower mold 4 and out of the girdler shell 5. The lower mold assembly, with a molded lens element 8 on the opened molding surface 4a of the lower mold 4, is further transferred to the work loading/unloading station where the molded optical lens product on the lower mold 4 is ejected therefrom and replaced by fresh optical glass material 6. These operations are repeated to mold optical lens elements automatically and continuously.

In this connection, the shape of optical glass material is determined in relation with the shape of optical lens elements of the end product. For example, in the case of an optical lens product with a large radius of curvature, the optical glass material can be spherical or nearly spherical in shape. However, in the case of an optical lens product with a small radius of curvature, individual work pieces of optical glass material should be of a somewhat flattened shape having curved surfaces of a predetermined radius of curvature instead of surfaces of spherical shape. At the time of press-forming optical glass material having such flattened curved surfaces, a center O1 of curvature on a front side 6a of glass material 6 as well as a center of curvature O2 on a rear side 6b of the glass material should be positioned exactly on an axis A which connects the centers of curvature O3 and O4 of molding surfaces 3a and 4a of the upper and lower molds 3 and 4 as shown in FIG. 14. If the centers of curvature O1 and O2 on the front and rear sides of the optical glass material is deviated from the axis A, pressure is non-uniformly applied to the glass material in the pressing stage to produce a lens element which is distorted in optical characteristics.

In the work loading stage, the optical glass material 6 is picked up from a pallet by a robot with a suction gripper means or the like and set on the shaping surface 4a of the lower mold 4. At the time when the optical glass material 6 is released from the suction gripper, compressed air is usually blasted on the glass material in order to transfer same onto the lower mold 4 positively or in a forced way. Therefore, positional deviations may occur to the optical glass material 6 when it is transferred in this manner, more particularly, when it is picked up and also when it is set on the lower mold 4. Especially, since the lower mold 4 is circumvented by the girdler shell 5, the pressure of compressed air which is used to blow the optical glass material off the suction gripper means can find no way to escape and acts on the optical glass material directly and repeatedly to cause positional deviations to the latter, shifting the centers of curvatures O1 and O2 on the front and rear surfaces of the optical glass material 6 away from the axis A.

SUMMARY OF THE INVENTION

In view of the above-described situations, it is an object of the present invention to provide a transfer mechanism which is capable of transferring work pieces of optical glass material from a container such as a pallet or the like onto a mold unit in such an accurate and reliable manner as to preclude positional deviations.

It is another object of the present invention to provide a transfer mechanism of the sort as mentioned above, which can transfer work pieces of optical glass material having curved surface on the opposite sides thereof accurately in an aligned or centered position on a mold unit, so that substantially uniform pressure is applied to the glass material as a whole in a press-molding stage.

It is still another object of the present invention to provide a transfer mechanism of the sort as mentioned above, which can be incorporated into an optical glass press-molding line for automation of glass molding operation or for improvement of product yield.

In accordance with the present invention, for achieving the above-stated objectives, there is provided a transfer mechanism for transferring optical glass material to be molded into an optical element, from a container holding a large number of work pieces of the optical glass material, each having a curved surface contour on upper and lower sides thereof, onto a molding surface of a lower mold member of a mold unit located at a work loading station of a glass molding line, the transfer mechanism comprising: a suction nozzle having a suction pad at a lower distal end thereof for gripping an upper surface of the optical glass material; a lift means adapted to move the suction nozzle member up and down in the vertical direction; a tubular positioning member located in such a way as to circumvent the nozzle member and adapted to hold outer periphery of the optical glass material in position; a support member adapted to support the positioning member vertically movably over a predetermined stroke length relative to the lift means; a stroke delimiting means adapted to limit a downward stroke of the positioning member such that a lower end of the positioning member is located at a position at least beneath the suction nozzle when lowered to a lowermost position.

The above-mentioned lift means may be arranged as a robot which is capable of moving in horizontal and vertical directions. Preferably, the positioning member is constituted by a simple cylindrical tube having an inside diameter substantially corresponding to outside diameter of the optical glass material, and an outside diameter smaller than inside diameter of work receptacle pockets provided on the container. Since there is little difference between the outside diameter of the optical glass material and the inside diameter of the positioning member, it is preferable for the positioning member to be provided with a tapered guide surface at and around lower inner edges for urging the optical glass material to get into the positioning member in a guided fashion.

In a more particular form of the invention, the support means is constituted by a liftable support member which is securely fixed to an upper end of the positioning member, and a pair of guide rods which are fixedly connected to the liftable support plate and vertically movable over a predetermined stroke length relative to the lift means. Further, as for a more particular example of the stroke delimiting means, it can be constituted by stoppers which are provided on the guide rods, and arranged to be brought into and out of abutting engagement with the lift means to determine a lowermost position of said support means. In this case, the lowermost position of the support means is limited by abutting engagement of the stoppers with the lift means. Further, a biasing means may be interposed between the support means and the lift means thereby to urge the support means toward the lowermost position. Preferably, a push-up means is provided between the guide rods and the lift means thereby to push up the lower end of the positioning member to a position above a work gripping surface of the suction nozzle and to hold the suction nozzle in an open state whenever necessary.

The above and other objects, features and advantages of the present invention will become apparent from the following particular description, taken in conjunction with the accompanying drawings which show by way of example a preferred embodiment of the invention.

DESCRIPTION OF PREFERRED EMBODIMENTS

Hereafter, the present invention is described more particularly by way of its preferred embodiment with reference to the accompanying drawings. In the following description of a preferred embodiment, the present invention is described in relation with molding of an optical glass lens. However, it is to be understood that the invention can be similarly applied to optical glass products other than lenses, and that the invention is not restricted to a molding machine of a particular construction as shown below.

Figure 1:
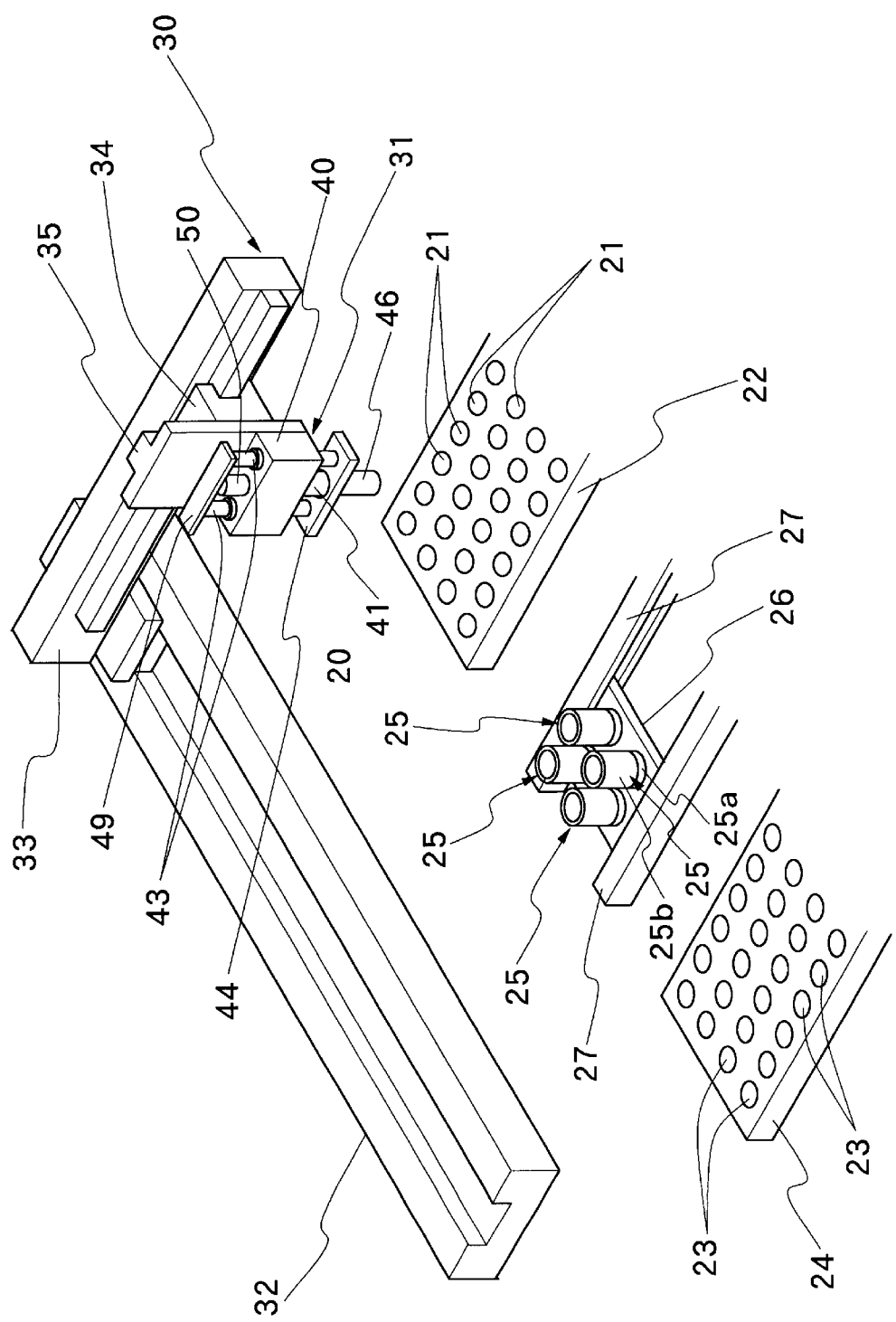
FIG. 1 is a schematic illustration of a work loading/unloading station employing an optical glass transfer mechanism embodying the present invention.

Referring first to FIG. 1, there is shown the general arrangement of a work loading/unloading station 20. As shown particularly in that figure, provided at the work loading/unloading station 20 are a work loading pallet or tray which holds a number of pieces of optical glass material 21 to be formed into optical lenses on a molding press which will be described hereinlater, and a work unloading pallet 24 which serves to hold molded lens products 23. Indicated at 25 are a number of mold assembly units (four mold assembly units are shown in FIG. 1) which are placed on a transfer plate 26 for transfer to and from the work loading/unloading station 20 where pieces of optical glass material 21 are picked up from the loading pallet 22 and set on the respective mold units 25 after picking up and putting molded lens products 23 on the unloading pallet 24. At this time, each mold unit 25 consists of a lower mold member 25a and a girdler shell 25b since an upper mold member is removed therefrom before arrival at the loading/unloading station 20.

In order to carry out the above-mentioned loading and unloading operations, an optical glass transfer mechanism 30 is provided at the loading/unloading station 20. The optical glass transfer mechanism 30 includes a handling means 31 which is movable along two perpendicularly intersecting axes in a horizontal plane, that is, in X- and Y-directions, and also movable along a vertical axis Z within a limited stroke. For this purpose, the optical glass transfer mechanism 30 is provided with a tipple axis robot as its drive means. In one particular form of the 3-axis robot, it includes an X-axis guide 32 which is fixedly located in a predetermined position, a Y-axis arm 33 which is supported on the X-axis guide 32 movably for movements in the direction of X-axis, and a Z-axis block 34 which is connected to the Y-axis arm 33 movably for movements in the direction of Y-axis. Provided on the Z-axis block 34 is a Z-axis guide thereby to guide a lift portion 35 up and down in the direction of Z-axis. The handling means 31 is connected to the just-mentioned lift member 35. It follows that the handling means 31 is movable in the directions of the three axes X, Y and Z. As drive means for moving the Y-axis arm 33, Z-axis block 34 and lift member 35 in the directions of X-, Y- and Z-axes, respectively, there may be employed, for example, ball screw feeders or similar drive means which are capable of precise positioning of these members. Since the drive means of this sort are well known in the art, they are omitted in the drawings.

Figure 2:
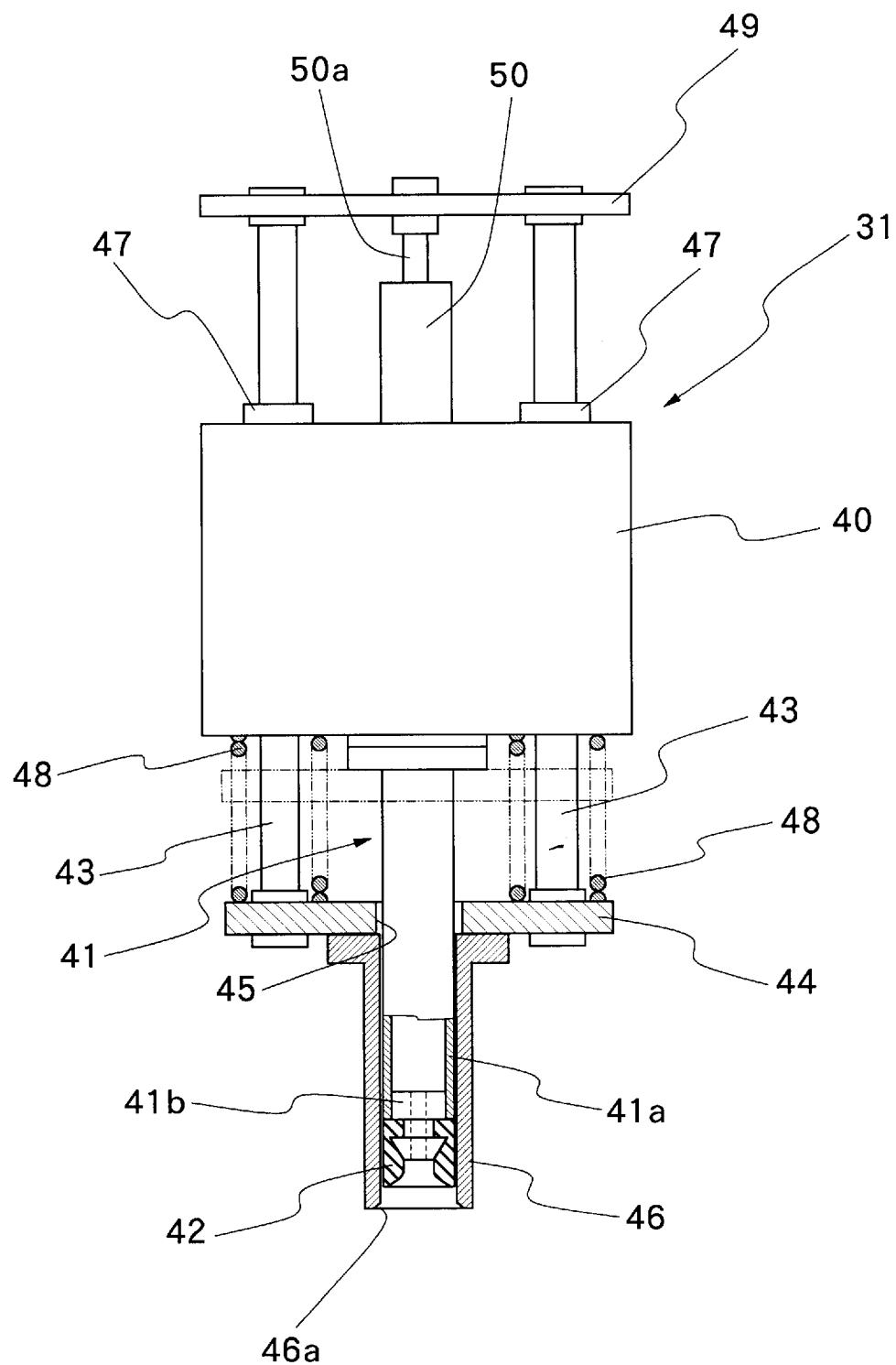
FIG. 2 is a schematic front view of a work handling means.

Shown in FIG. 2 is a construction of the handling means 31. In this figure, indicated at 40 is a main body block which is fixedly connected to the lift member 35. Fixedly attached to the main body block 40 is a suction nozzle 41 which is extended straight in the downward direction from the lower side of the main body block 40. The suction nozzle 41 is constituted by a tubular main body 41a of a predetermined length, and a nozzle head 41b which is fixedly fitted in a fore end portion of the tubular main body 41a and internally provided with an axial suction passage. Detachably attached to the nozzle head 41b is a suction pad 42 which is formed of resilient material such as rubber or the like. Thus, as the suction pad 42 is resiliently abutted against a work piece of optical glass material 21, it can pick up and hold the latter without damaging its surfaces.

A pair of guide rods 43 are passed through the main body block 40 of the handling means 31, and a liftable support plate 44 is securely connected to the lower ends of the guide rods 43. The suction nozzle 41 is loosely received in an aperture 45 which is bored in the liftable support plate 44, and extended to a predetermined position beneath the liftable support plate 44. Securely fixed to the lower side of the liftable support plate 44 is a positioning member 46 in the form of a cylindrical tube which is located in such a way as to circumvent the outer periphery of the suction nozzle 41 to function as a positioning member for holding the outer periphery of the optical glass material 21 accurately in position. Accordingly, the outside diameter of the suction nozzle 41 is smaller than that of the optical glass material 21, while the inside diameter of the positioning member 46 is larger than the outside diameter of the optical glass material 21. In order to place the outer periphery of the optical glass material 21 in position as precisely as possible, the positioning member 46 should preferably be dimensioned such that, when it is located around the optical glass material, its inner peripheral surface substantially comes into contact with the outer periphery of the optical glass material 21 without forming a gap space therearound. Instead of circumventing the entire outer periphery of the optical glass material 21, the positioning member may be arranged to position the optical glass material by engaging the outer periphery of the glass material 21 at three different points thereof. Further, the positioning member 46 is provided with a tapered guide portion 46a around inner edges of its lower end. By this tapered guide portion 46a, the optical glass material 21 is positively urged into engagement with the positioning member 46 despite the little difference in diameter between the positioning member 46 and the optical glass material 21 and even in a case where the optical glass material 21 on the loading pallet 22 happens to be in a somewhat deviated position relative to the positioning member 46.

The guide rods 43 which are passed through the main body block 40 are each provided with a stopper 47 on the upper side of the main body block 40. Springs 48 are charged between the liftable support plate 44 and the main body block 40, urging the liftable support plate 44 in the downward direction until the stoppers 47 on the guide rods 43 are abutted against the upper side of the main body block 40, holding the liftable support plate 44 into its lowermost position. The lowermost position of the liftable support plate 44 is determined relative to the position of the suction nozzle 41 such that, when the optical glass material 21 is sucked onto the suction nozzle 41, the positioning member 46 which is fixed to the liftable support plate 46 is located in a position where the outer periphery of the optical glass material 21 is surrounded by the positioning member 46, preferably completely received in a lower end portion of the positioning member 46.

The paired guide rod 43 are projected above the stoppers 47 by a predetermined length and are connected with each other by a connecting plate 49 at their upper ends. The connecting plate 49 is tied to a rod member 50a of an air cylinder 50 which is mounted on the main body block 40. In this instance, the rod member 50a of the air cylinder 50 is extended out upon introducing an air pressure into an internal pressure chamber of the air cylinder 50 to push the support plate 44 upward (an actuated state). As soon as the pressure chamber is opened to the atmosphere, the cylinder 50 substantially loses its functions as an air cylinder (a de-actuated state). When in the de-actuated state, the liftable support plate 44 is pushed down to the lowermost position by the action of the spring 48, holding the positioning member 46 stably in the lowered position. On the other hand, as soon as an air pressure is introduced into the air cylinder 50 to put same in the actuated state, extending out the rod 50a, the connecting plate 49 is lifted up along with the guide rods 43. As a consequence, the liftable support plate 44 which is connected to the lower ends of the guide rods 43 is pushed up against the action of the springs 48. This upward stroke of the liftable support plate 44 corresponds to the distance between the lower and upper positions which are indicated by solid and imaginary lines in FIG. 2. While the liftable support plate 44 is lifted to an upper stroke end position, the positioning member 46 is moved upward relative to the suction nozzle 41, uncovering the suction nozzle 42 in a completely exposed state.

Accordingly, when the air cylinder 50 is put in the de-actuated state, the transfer mechanism 30 functions as a loading transfer device to transfer the optical glass material 21 from a loading pallet 22 to a mold unit 25. When the air cylinder 50 is put in the actuated state by supply of an air pressure, moving the liftable support plate 44 to the upper position and uncovering the circumference of the suction nozzle 41, the transfer mechanism 30 functions as an unloading transfer device, picking up a molded lens product 23 of an increased diameter by the suction nozzle and transferring it to a work unloading pallet 24.

The present embodiment of the transfer mechanism according to the present invention operates in the manner as described below with reference to FIGS. 3 through 11.

Firstly, for a work loading operation, the air cylinder 50 of the transfer mechanism 30 is put in the de-actuated state. In this state, the positioning member 46 which is attached to the liftable support plate 44 is held in the lowermost position by the action of the springs 48, with the lower end of the positioning member 46 located at a lower level than the lower end of the suction nozzle 41 which is suspended from the main body block 40. Then, as shown in FIG. 3, the Y-axis arm 33 and Z-axis block 34 are moved in suitable directions for positioning the suction nozzle 41 over the optical glass material 21 which is placed in a recessed nesting pocket 22a of a loading pallet 22.

Figure 3:
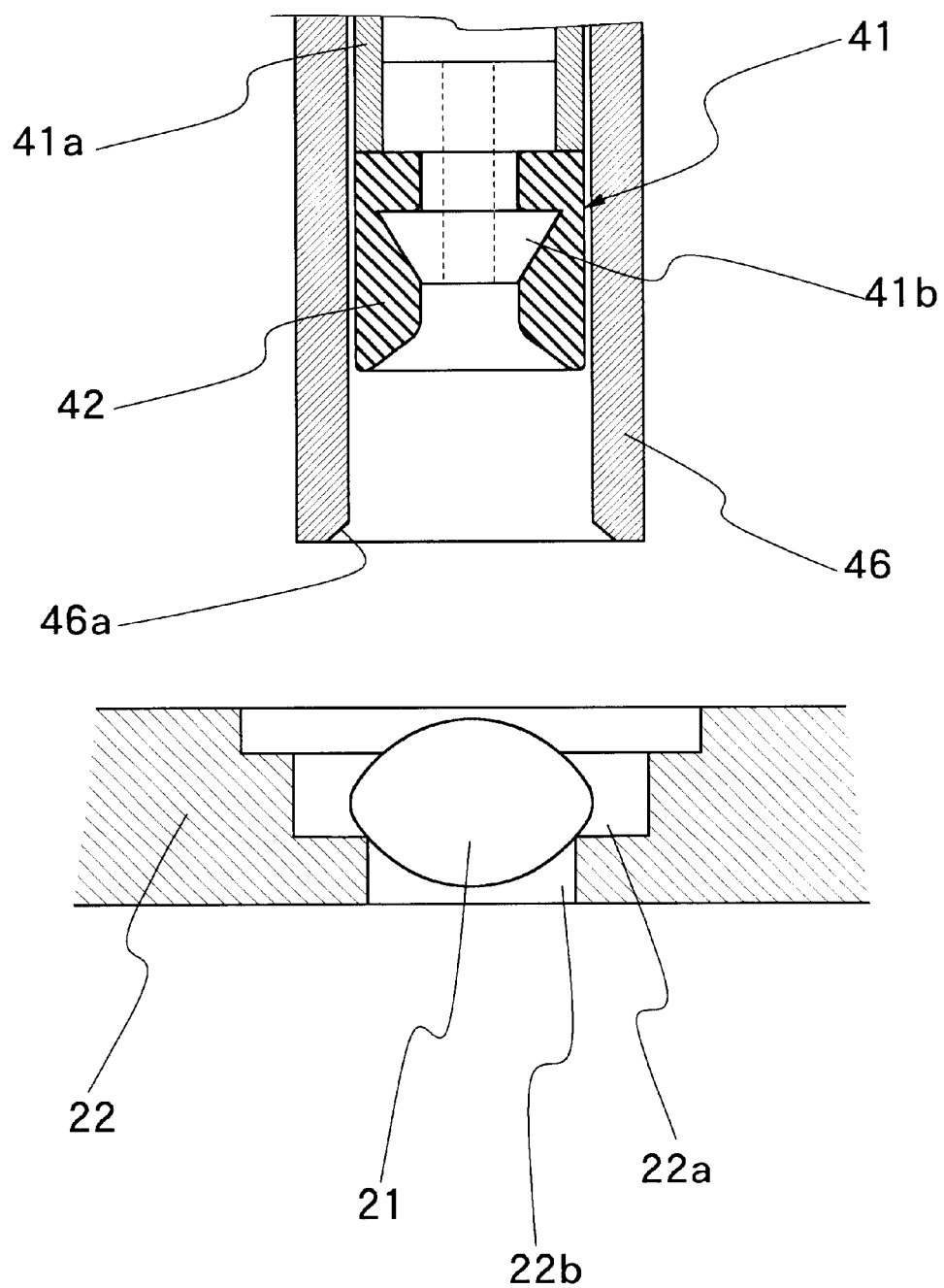
FIG. 3 is a schematic sectional view taken through a suction nozzle and a positioning member on the verge of picking up a piece of optical glass material from a work loading pallet.
Figure 4:
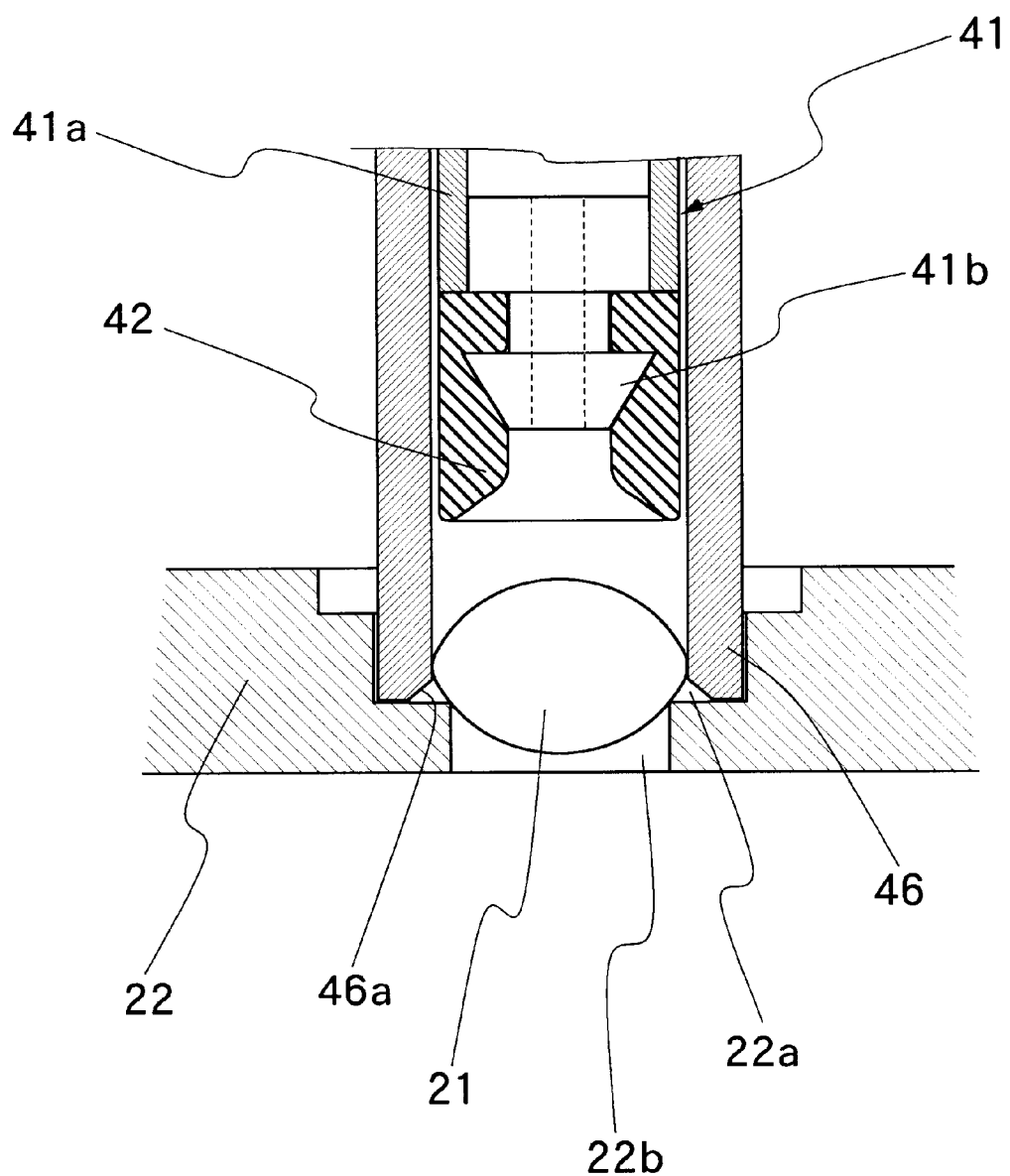
FIG. 4 is a schematic sectional view taken through the suction nozzle and positioning member in an operational phase in which a piece of optical glass material is set in position within a recessed nesting pocket of the loading pallet.

In this instance, as shown particularly in FIG. 3, the nesting pockets 22a of the loading pallet 22 are arranged to have a diameter which is larger than the outside diameter of the optical glass material 21 and can receive a the positioning member 46 therein. Accordingly, the outer periphery of the glass material 21 is not restricted by peripheral wall portions of the nesting pocket 22a. Nevertheless, since the optical glass material 21 has a curved surface of a predetermined radius of curvature on the back side thereof, it can be stably retained in position within the nesting pocket 22b by engagement with edges of a positioning aperture 22b which is formed centrally of the nesting pocket 22b. Therefore, the optical glass material 21 can be retained in position on the loading pallet 22 almost free of positional deviations.

The handling means 31 as a whole is lowered upon lowering the lift member 35 which is mounted on the Z-axis block 34. At this time, first of all, a fore end portion of the positioning member 46 which is located in a lowermost position on the handling means 31 is allowed to enter the nesting pocket 22a of the work loading pallet 22. At this time, along the tapered guide surface which is provided at inner edges of the positioning member 46, the optical glass material 21 smoothly received in a distal end portion of the positioning member 46. Since there is little difference between the inside diameter of the positioning member 46 and the outside diameter of the optical glass material 21, the latter is securely and intimately captured in the positioning member 46.

Figure 5:
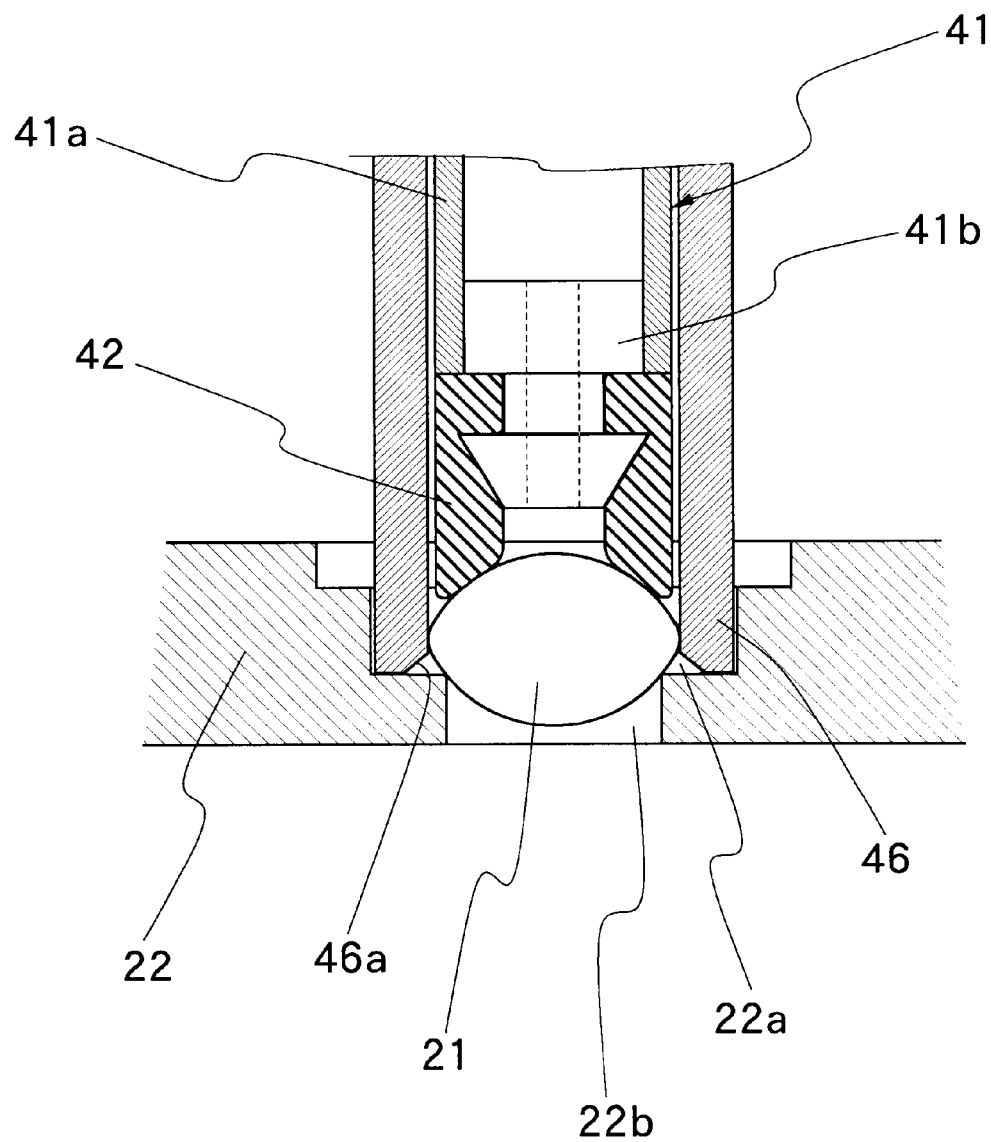
FIG. 5 is a schematic sectional view taken through the suction nozzle and positioning member in an operational phase in which a piece of optical glass material is being sucked by the suction nozzle.

The positioning member 46 is stopped as soon as it is abutted against the bottom wall of the recessed nesting pocket 22a. The positioning member 46 is fixedly connected with the liftable support plate 44 which in turn is fixedly connected with the guide rods 43. However, the guide rods 43 are relatively movably passed through the main body block 40. Therefore, after the positioning member 46 has come to a stop, the main body block 40 is allowed to move further in the downward direction. Accordingly, as the lift member 35 is moved downward over a predetermined stroke length from that position, the main body block 40 and the suction nozzle 41 which is suspended from the main body block 40 are further moved downward, compressing the springs 48 until abutted against the surface of the optical glass material 21 as shown in FIG. 5, while the liftable support member 44 remains standstill in the stopped position along with the positioning member 46.

Figure 6:
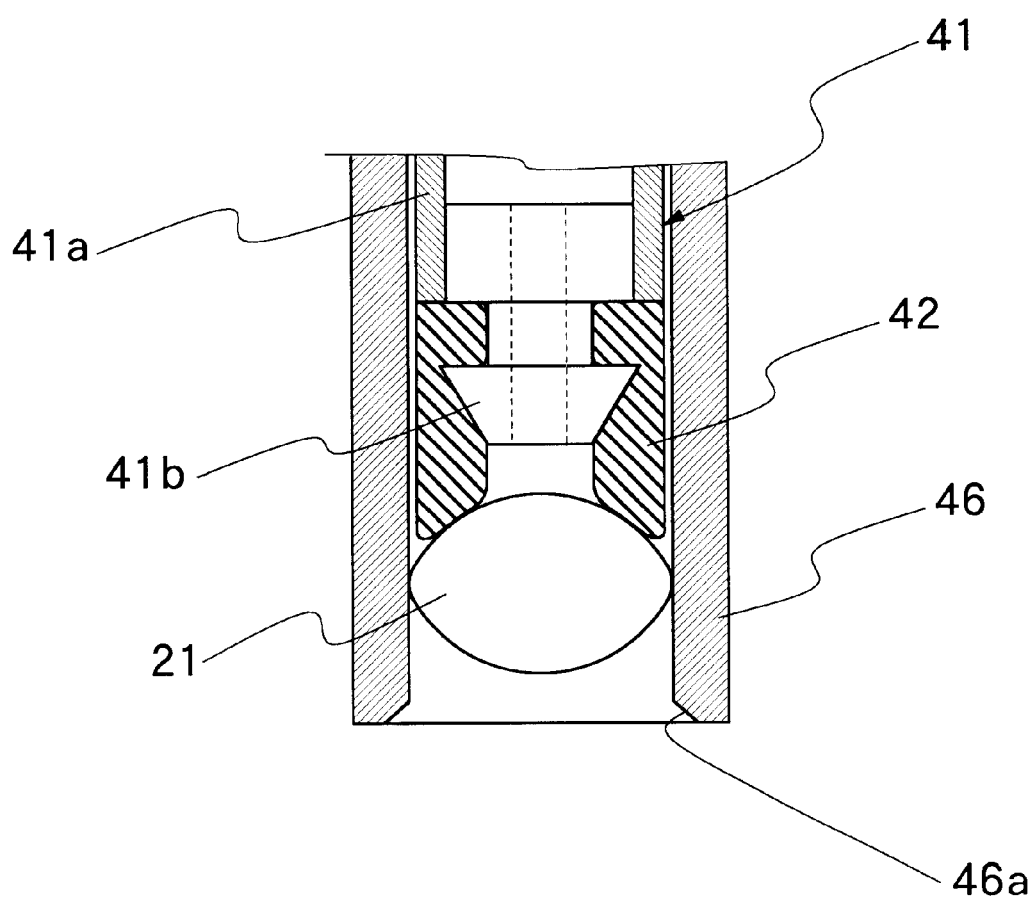
FIG. 6 is a schematic sectional view taken through the suction nozzle and positioning member in an operational phase in which a piece of optical glass material is picked up from the loading pallet.

As soon as the optical glass material 21 is gripped by the suction nozzle 41, the lift block 35 is moved upward. Upon the lift block 35 starting an upward movement, the main body block 40 is immediately moved upward, accompanied by the suction nozzle 41 which is connected with the main body block 40. At this time, however, the liftable support plate 44 and the positioning member 46 remain in the lower stopped position until the stoppers 47 on the guide rods 43 come into abutting engagement with the upwardly moving main body block 40. As a result, the optical glass material 21 which is gripped on the suction pad 42 of the suction nozzle 41 is retracted into a deeper position within the positioning member 46. As soon as the stoppers 47 come into abutting engagement with the main body block 40, the liftable support plate 44 and the positioning member 46 are moved along with the main body block 40. As a result, as shown in FIG. 6, the optical glass material is gripped by the handling means 31 and carried away from the work loading pallet 22. In so doing, the gripping force on the optical glass material 21 is produced by the suction nozzle 41. The optical glass material 21 is retained in position by the positioning member 46 and, at the same time completely covered under the positioning member 46 in a securely protected state to prevent same from dropping in the course of transfer.

Figure 7:
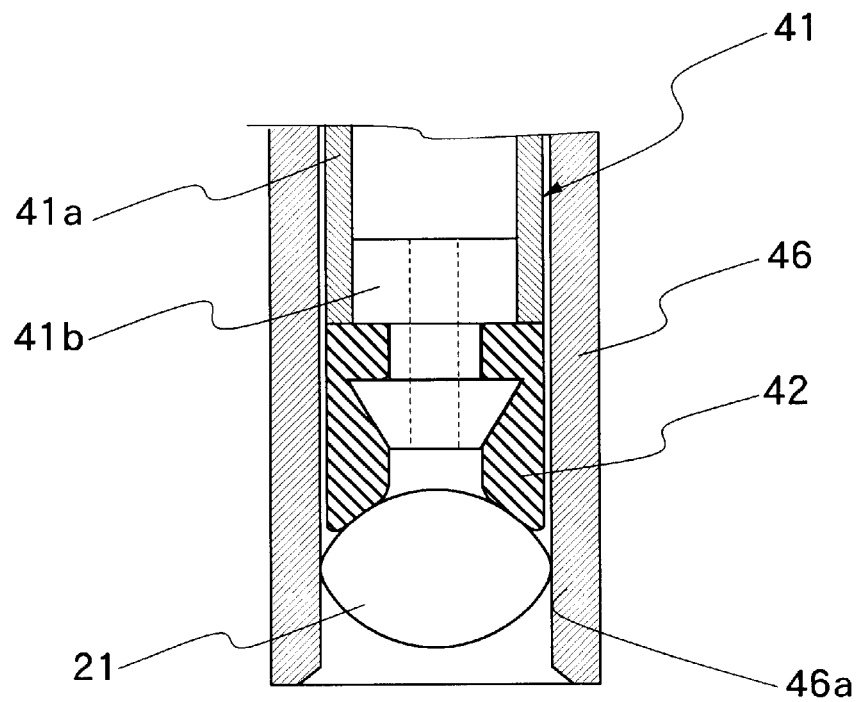
FIG. 7 is a schematic sectional view taken through the suction nozzle and positioning member in an operational phase in which the optical glass material is transferred onto a mold.
Figure 7:
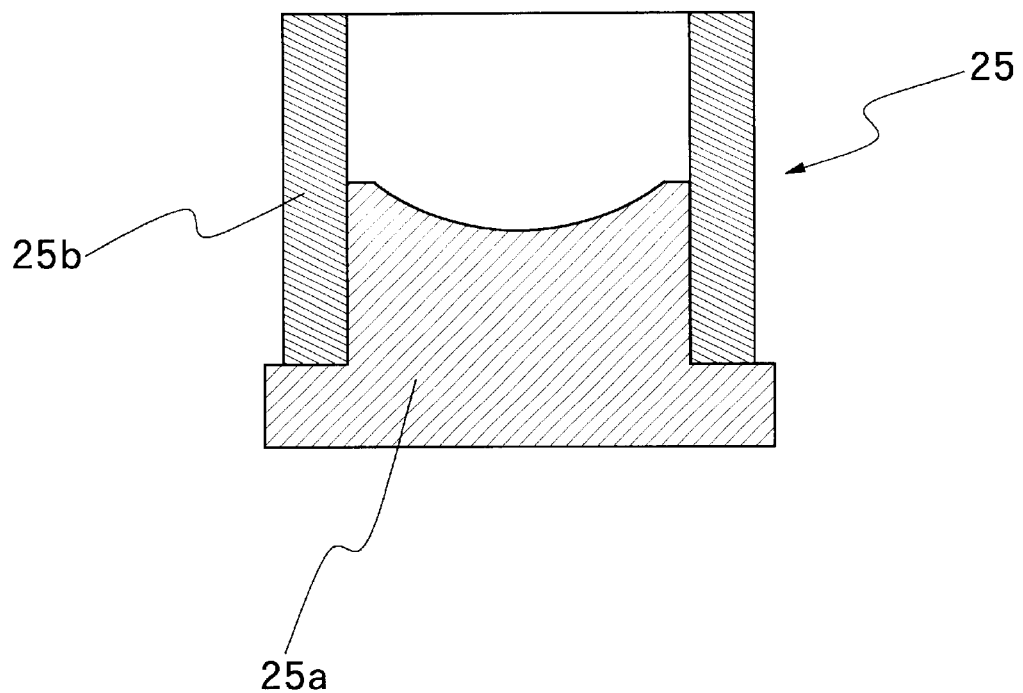

After moving the lift member 35 up to a predetermined position along the Z-axis block 34, the Y-axis arm 33 is moved along the X-axis guide 32, and then the Z-axis block 34 is moved along the Y-axis arm 33. By these movements, the handling means 31 is located in a position over a mold unit 25 which is placed on the transfer plate 26. At this time, the mold unit 25, which has been stripped of an upper mold member, is in the form of a lower mold assembly which is open on the upper side and composed of a lower mold 25a and a girdler shell 25b. Accordingly, the lower mold unit 25 becomes accessible by the handling means after moving the positioning member 46 to a centered position exactly in alignment with the lower mold member 25a as shown in FIG. 7, followed by lowering of the lift member 35. In that position, firstly the positioning member 46 is moved into the girdler shell 25b until it comes into abutting engagement with a molding surface of the lower mold member 25a. Namely, the abutting engagement with the lower mold member 25b stops the downward movement of the positioning member 46 and of the liftable support plate 44 which is fixedly connected with the positioning member 46. In this state, however, the optical glass material 21 which is sucked on the suction pad 42 of the suction nozzle 41 is still kept out of engagement with the lower mold member 25b.

Figure 8:
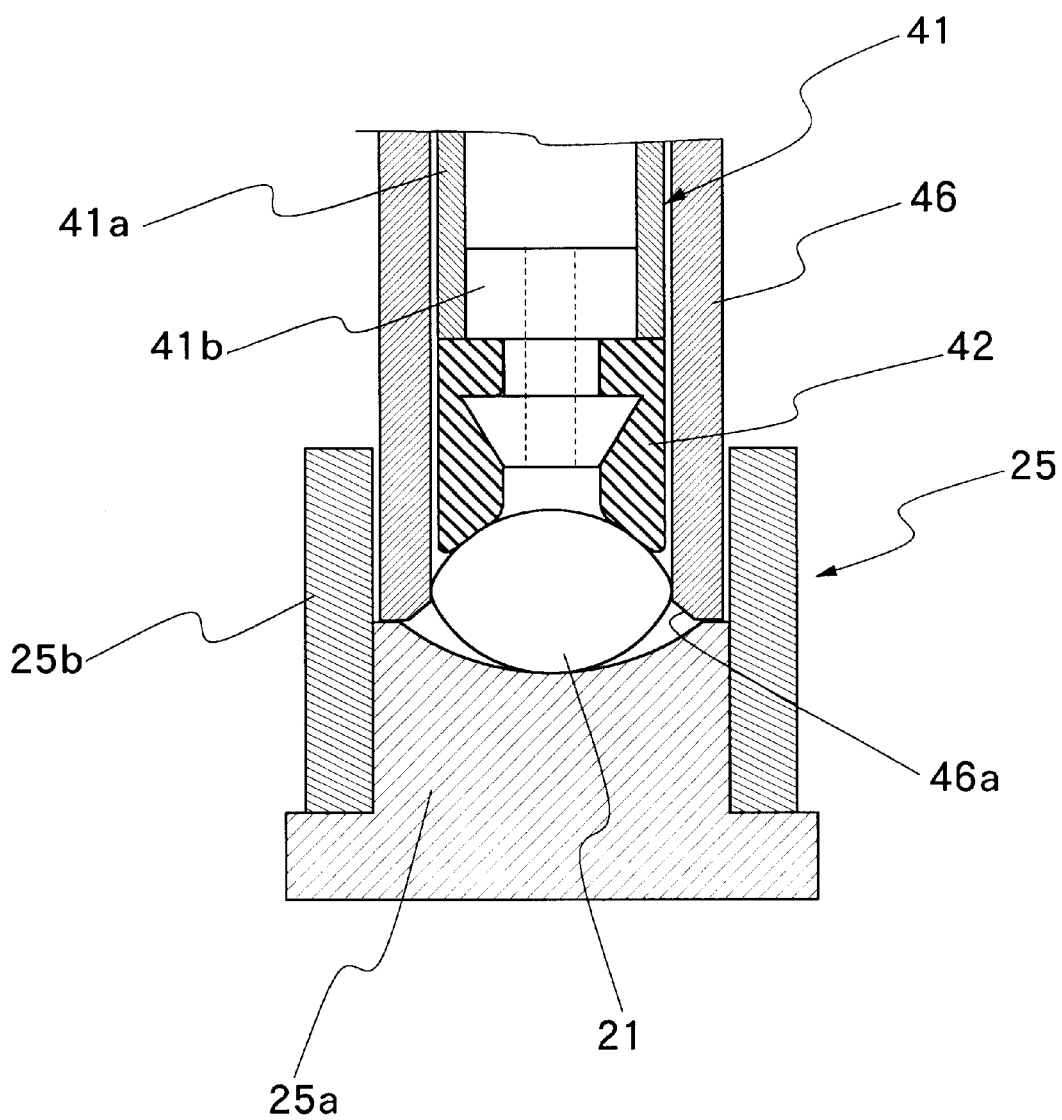
FIG. 8 is a schematic sectional view taken through the suction nozzle and positioning member in an operational phase in which the optical glass material is set in position in the mold.

As the lift member 35 is lowered further, the main body block 40 as well as the suction nozzle 41 which is connected with the main body block 40 is lowered, compressing the springs 48 and bringing the optical glass material 21 into abutting engagement with the molding surface of the lower mold member 25a as shown in FIG. 8. As a result, the positioning member 46 is accurately centered relative to the mold unit 25, and at the same time the optical glass material 21 which is retained in a just-fit state within the positioning member 46 is located accurately in a centered position relative to the mold unit 25.

Figure 9:
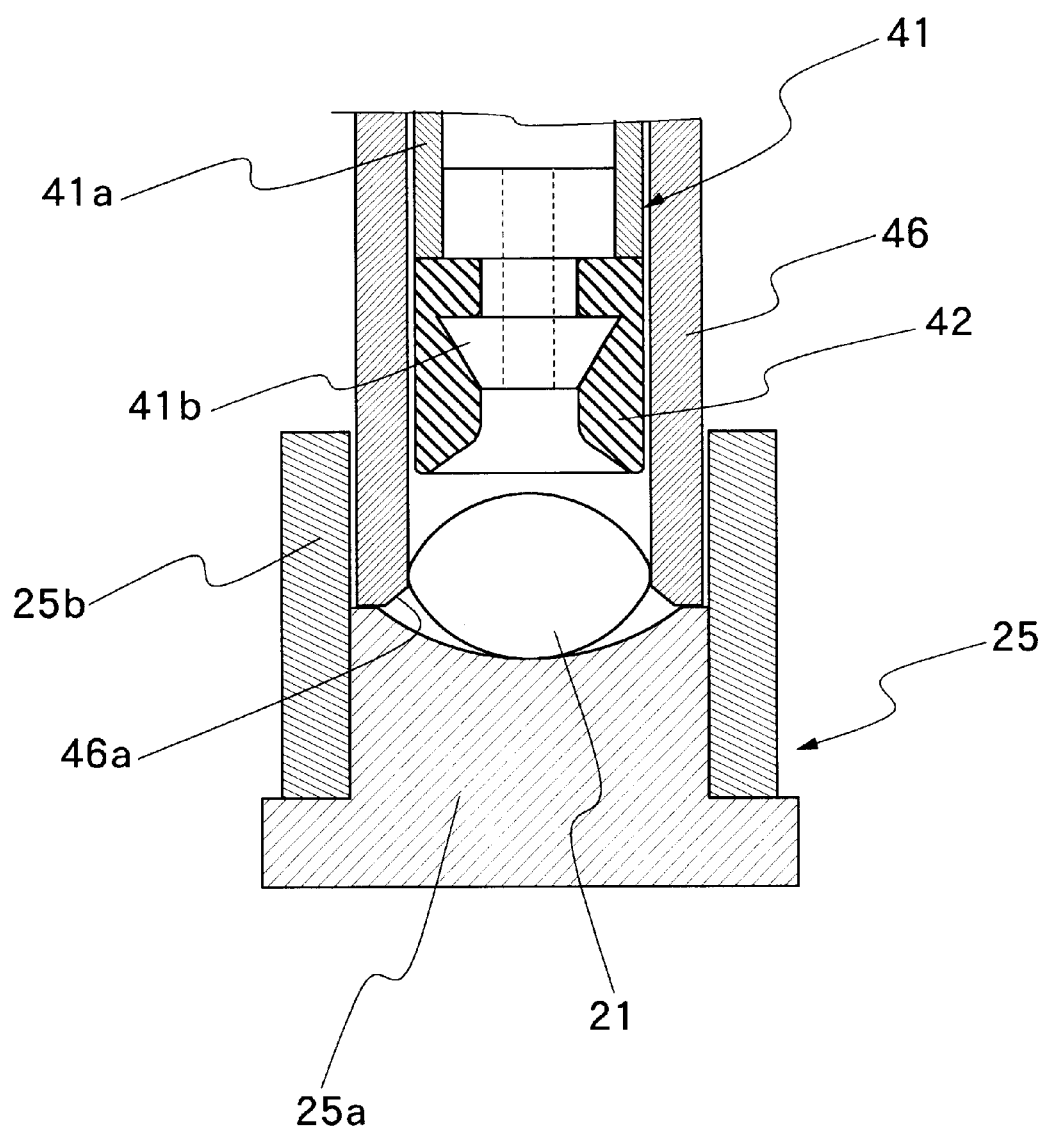
FIG. 9 is a schematic sectional view taken through the suction nozzle and positioning member in an operational phase in which the suction nozzle is disengaged from the optical glass material.

Nextly, the suction nozzle 41 is turned off to cancel its suction grip on the optical glass material 21, and the lift block 35 is moved upward, leaving the optical glass material 21 on the mold unit 25. At this time, in order to separate the suction pad 42 from the optical glass material in an assured manner, in addition to cancellation of the suction force of the suction nozzle 41, compressed air is blasted against the optical glass material 21 thereby to separate the latter forcibly from the suction nozzle 41. For this purpose, immediately after initiation of an upward movement of the handling means 31 on the lift member 35, compressed air is suppled to the suction pad 42 for instantaneously short period of time. When the handling means 31 starts an upward movement, it is accompanied by the suction nozzle 41, but the positioning member 46 is abutted against the lower mold member 25a for a certain time period until the state of FIG. 9 is reached. Therefore, if compressed air is spurted out from the suction pad 42 during this time period, there is little possibility of the optical glass material 21 being pushed to a deviated position by the air pressure.

Figure 10:
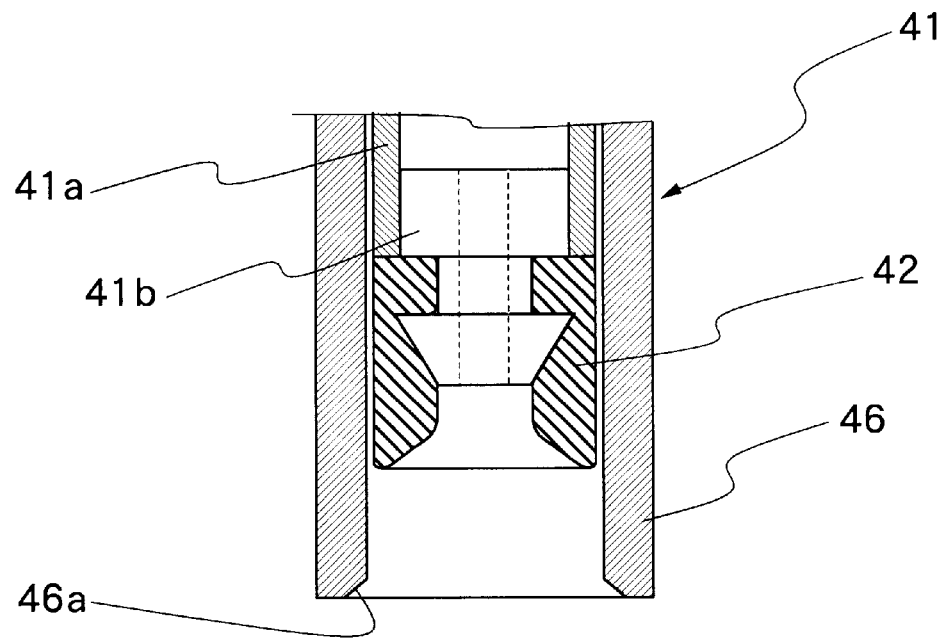
FIG. 10 is a schematic sectional view taken through the suction nozzle and positioning member which are separated away from the mold.
Figure 10:
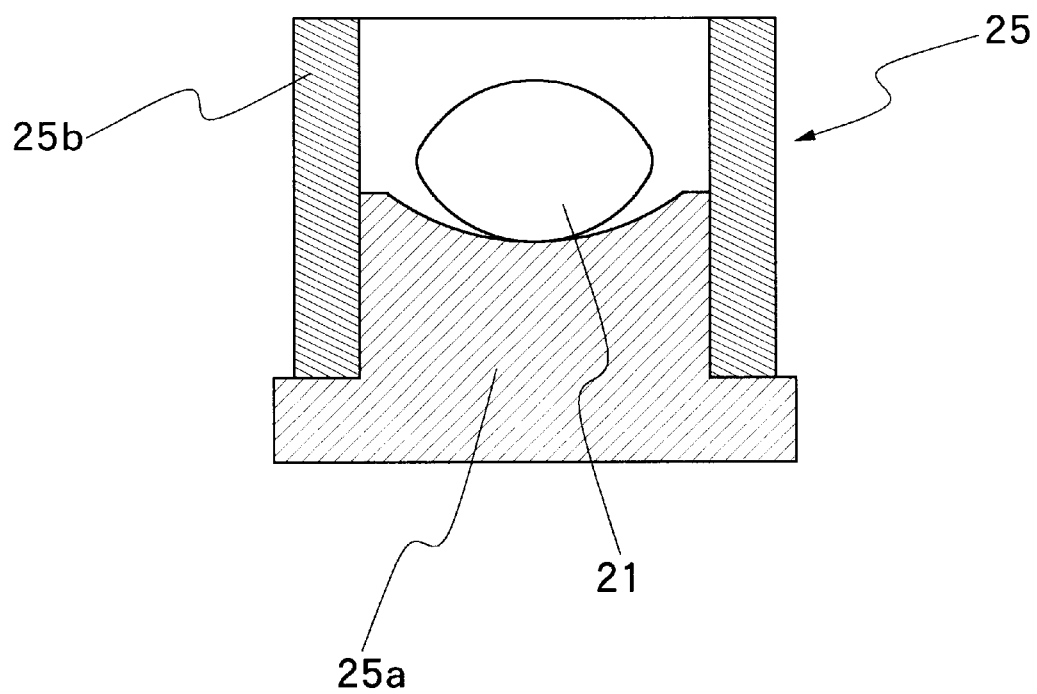
Figure 13:
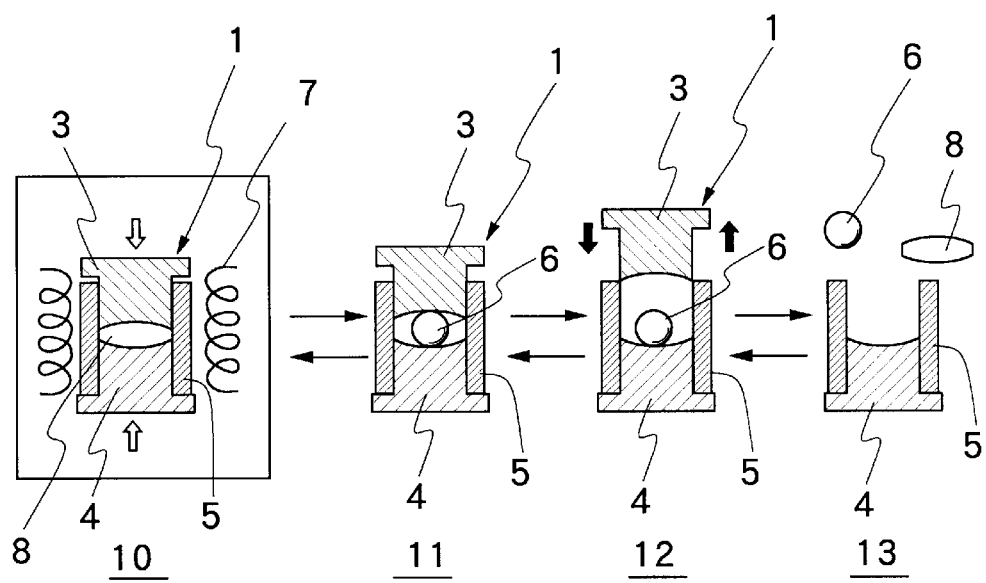
FIG. 13 is a schematic illustration of an automatic lens molding apparatus.
Figure 14:
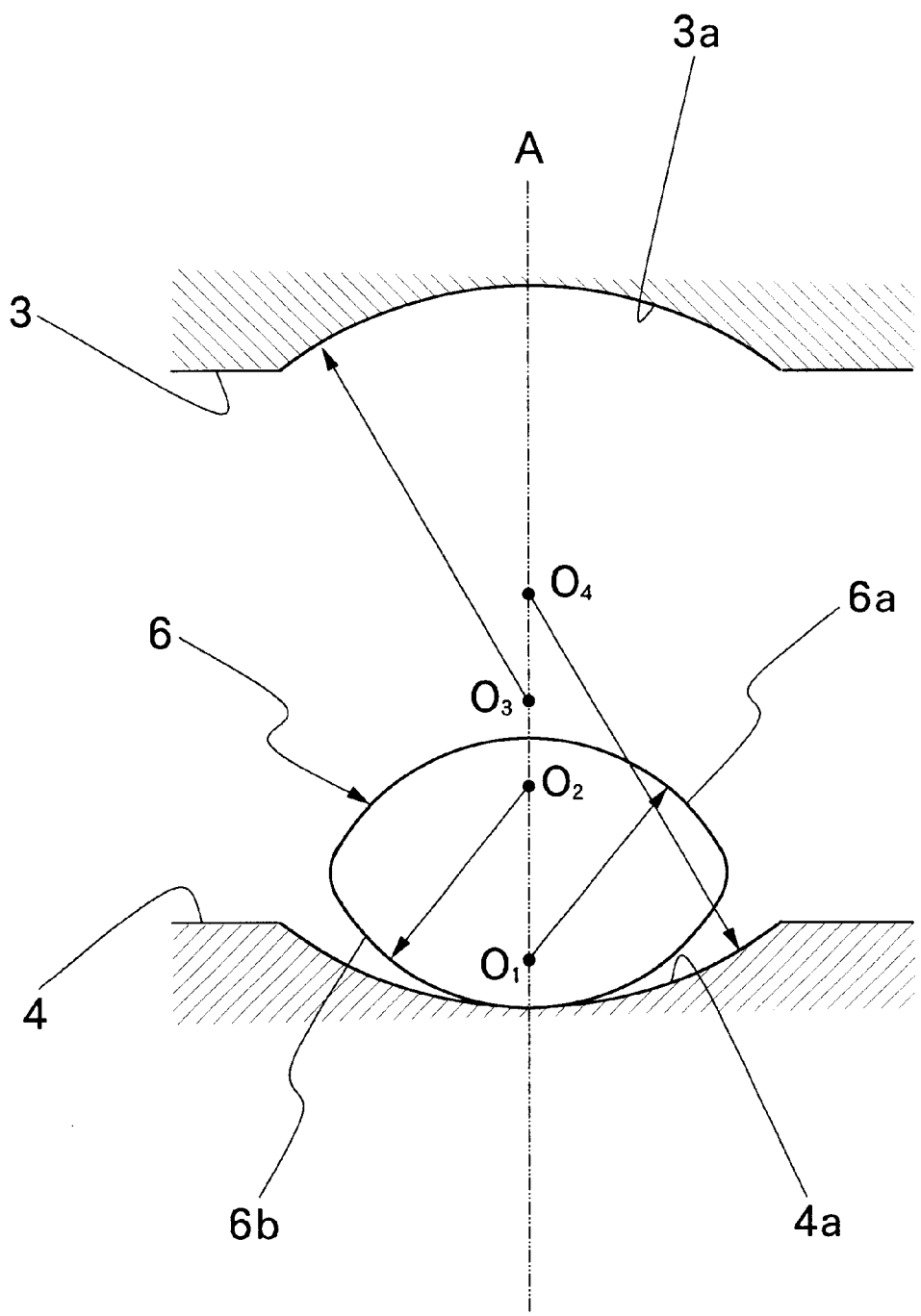
FIG. 14 is a schematic illustration showing positional relations of optical glass material with upper and lower mold members of a mold assembly unit.

Accordingly, as the handling means 31 is moved to an upper position, completely disengaged from the mold unit 25 as shown in FIG. 10, the optical glass material 21 is handed over from the suction pad 42 of the suction nozzle 41 to the lower mold member 25a of the mold unit 25 in an extremely assured manner. Besides, the optical glass material 21 is set in a centered position in alignment with the axis of the lower mold member 25a. After this, the mold unit 25 is fed forward from the work loading/unloading station 20, and, in the same manner as shown in FIG. 13, sent into a molding chamber 25 through an entrance/exit way to the molding chamber 25, after assembling an upper mold member at an upper mold assembling/dissembling station. Within the molding chamber 25, the mold unit 25 is pressed under heated conditions to produce a molded optical lens 23. In this press-molding process, pressure is applied uniformly to the optical glass material 21 which is accurately placed in a centered position within the mold unit 25, to produce a molded lens product which is free of distortions in shape or in optical properties.

Figure 11:
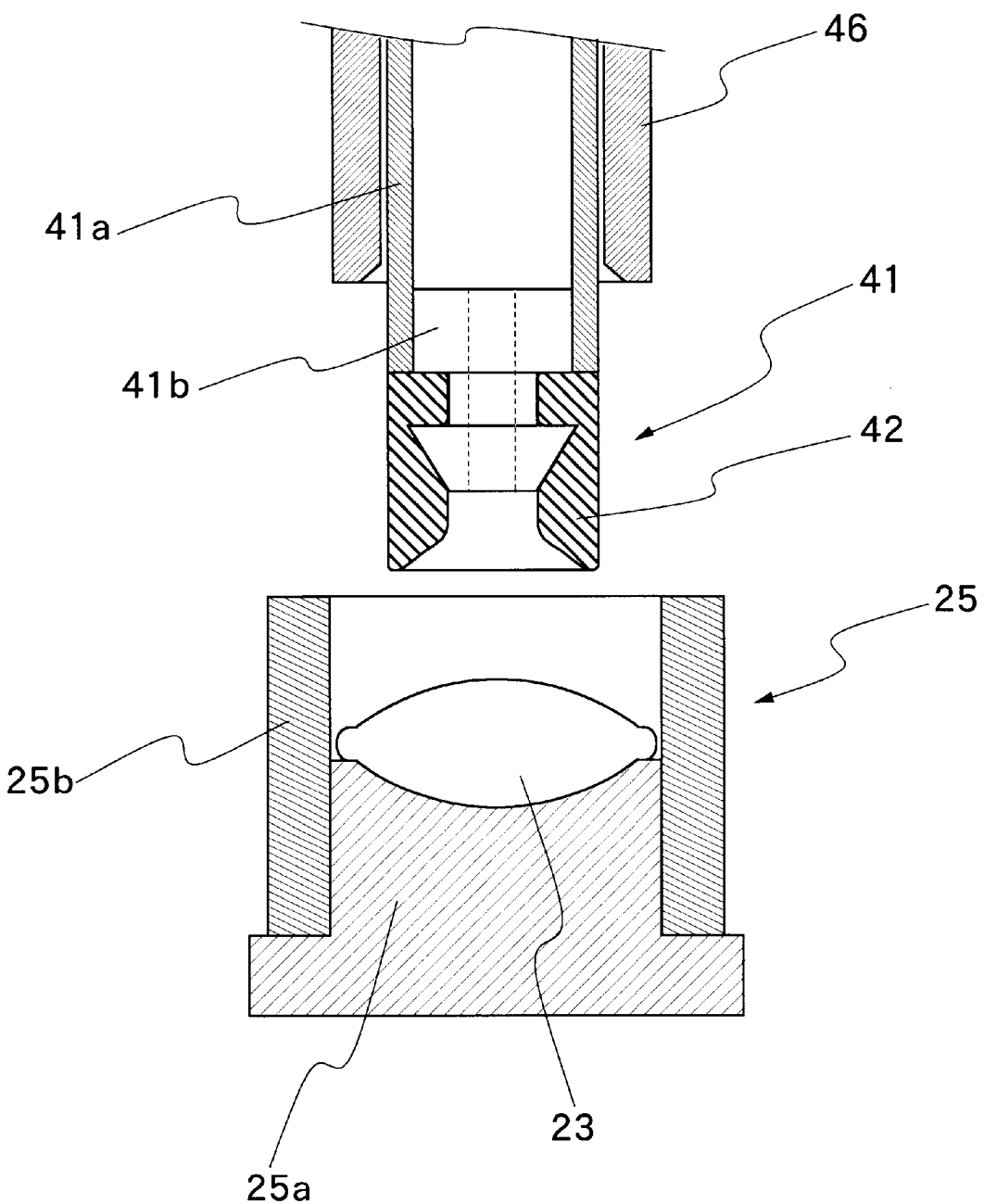
FIG. 11 is a schematic sectional view taken through the suction nozzle and positioning member to show their positional relations at the time of a work unloading operation by a handling means.
Figure 12:
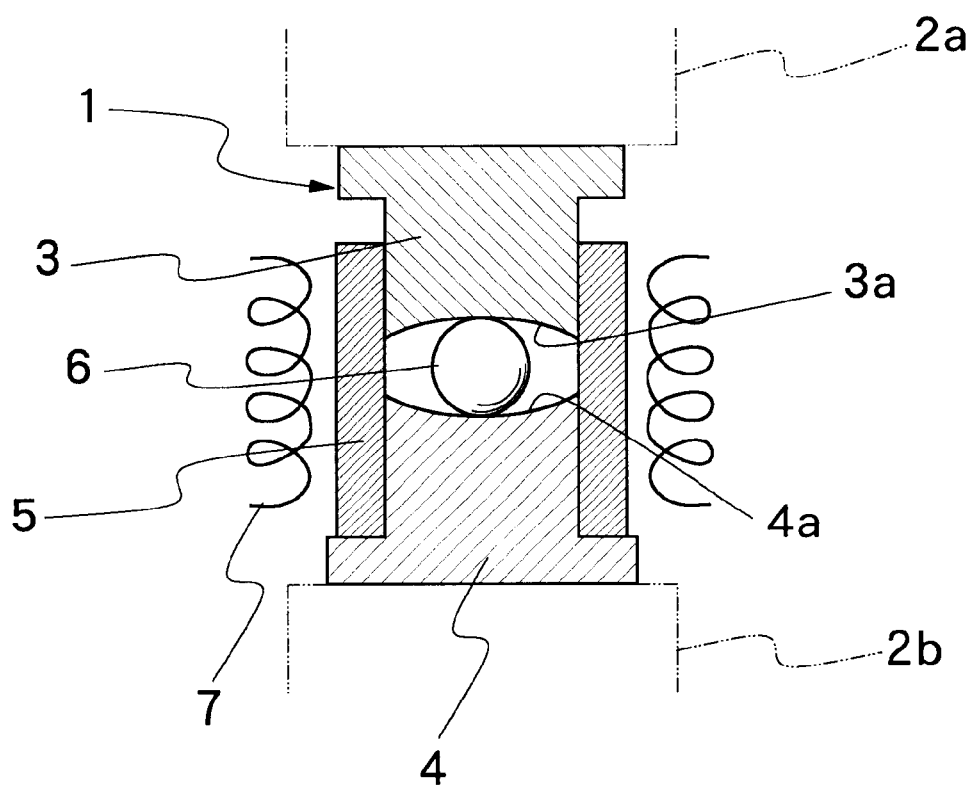
FIG. 12 is a schematic sectional view of a prior art lens molding apparatus.

The molded lens product 23 which is obtained by press-molding is increased in diameter as compared with the optical glass material 21, so that it cannot be sucked onto the suction pad 42 of the suction nozzle 41 which is in a retracted position within the positioning member 46. This is the very reason why the rod member 50a of the air cylinder 50 is connected to the connector plate 49 at the upper ends of the guide rods 43. Namely, upon turning the air cylinder 50 into an actuated state, its rod 50a is extended out to move the guide rods 43 in the upward direction. Whereupon, the liftable support plate 44 and the positioning member 46 are moved upward to uncover the suction pad 42. Accordingly, now the molded lens product 23 can be picked up by the suction pad 42 as shown in FIG. 11, without being blocked by the positioning member 46.

As described above, by way of the air cylinder 50, the transfer mechanism 30 can be switched between a loading position for transferring optical glass material 21 from a work loading pallet 22 to a mold unit and an unloading position for transferring a molded lens product from a mold unit to a work unloading pallet 24. Besides, in the work loading stage, the optical glass material can be loaded accurately in a centered position within a mold unit by means of the positioning member 46, and, in the unloading stage, a molded lens product 23 of an increased diameter can be securely sucked onto the suction pad for transfer to an unloading pallet 24.

What is claimed is:

1. A transfer mechanism for transferring optical glass material to be molded into an optical element, from a container holding a large number of work pieces of said optical glass material, each having a curved surface contour on upper and lower sides, onto a molding surface of a lower mold member of a mold unit located at a work loading station of a molding line, said transfer mechanism comprising:

a suction nozzle having a suction pad at a lower distal end thereof for gripping a surface of said optical glass material;

a lift means adapted to move said suction nozzle member up and down in the vertical direction;

a tubular positioning member relatively movably fitted around said nozzle member and adapted to engage with outer peripheral edges of said optical glass material to hold same in position relative to said suction nozzle;

a support member adapted to support said positioning member in such a way as to permit the latter to move vertically over a predetermined stroke length relative to said lift means; and a stroke delimiting means provided between said support member and lift means, and adapted to limited a downward stroke of said support member when a lower end of said positioning member is lowered into engagement with outer peripheral edges of said optical glass material.

2. A transfer mechanism for optical glass material as defined in claim 1, wherein said lift means is arranged as a robot which is capable of moving in the horizontal and vertical directions.

3. A transfer mechanism for optical glass material as defined in claim 1, wherein said positioning member is constituted by a cylindrical tube having an inside diameter substantially corresponding to outside diameter of said optical glass material, and an outside diameter smaller than inside diameter of work receptacle pockets provided on said container.

4. A transfer mechanism for optical glass material as defined in claim 3, wherein said positioning member is provided with a tapered guide surface at and around lower inner edges thereof.

5. A transfer mechanism for optical glass material as defined in claim 1, wherein said support member comprises a liftable support member securely fixed to an upper end of said positioning member, and a pair of guide rods which are fixedly connected to said liftable support member and vertically movable over a predetermined stroke length relative to said lift means.

6. A transfer mechanism for optical glass material as defined in claim 5, wherein said stroke delimiting means is constituted by stoppers provided on said guide rods, and arranged to be brought into and out of abutting engagement with said lift means to determine a lowermost position of said support member.

7. A transfer mechanism for optical glass material as defined in claim 5, further comprising a biasing means interposed between said support member and said lift means thereby to urge said support member toward said lowermost position.

8. A transfer mechanism for optical glass material as defined in claim 5, further comprising a push-up means provided between said guide rods and said lift means thereby to push up lower end of said positioning member to a position above a work gripping surface of said suction nozzle.

* * * * *